United States Patent
Kakishima et al.

(10) Patent No.: US 11,121,837 B2
(45) Date of Patent: Sep. 14, 2021

(54) USER EQUIPMENT AND METHOD OF SRS TRANSMISSION

(71) Applicants: NTT DOCOMO, INC., Tokyo (JP); DOCOMO Innovations, Inc., Palo Alto, CA (US)

(72) Inventors: Yuichi Kakishima, Tokyo (JP); Ryosuke Osawa, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/483,314

(22) PCT Filed: Feb. 2, 2018

(86) PCT No.: PCT/US2018/016703
§ 371 (c)(1),
(2) Date: Aug. 2, 2019

(87) PCT Pub. No.: WO2018/144916
PCT Pub. Date: Aug. 9, 2018

(65) Prior Publication Data
US 2019/0379502 A1    Dec. 12, 2019

Related U.S. Application Data

(60) Provisional application No. 62/454,501, filed on Feb. 3, 2017.

(51) Int. Cl.
*H04L 5/00* (2006.01)
*H04B 7/0417* (2017.01)
*H04B 7/06* (2006.01)

(52) U.S. Cl.
CPC ......... *H04L 5/0048* (2013.01); *H04B 7/0417* (2013.01); *H04B 7/0619* (2013.01); *H04L 5/0023* (2013.01); *H04L 5/0091* (2013.01)

(58) Field of Classification Search
CPC .. H04B 7/0695; H04B 7/0417; H04B 7/0617; H04B 7/0619; H04L 5/0023; H04L 5/0048; H04L 5/0091
See application file for complete search history.

(56) References Cited

PUBLICATIONS

Huawei et al: "UL SRS design for CSI acquisition and beam management", 3GPP Draft; R1-1700074, 3RD Generation Partnership Project (3GPP), Mobile Competence Centre ; 650, Route Des Lucioles ; F-06921 Sophia-Antipolis Cedex ; (Year: 2017).*

(Continued)

*Primary Examiner* — Elton Williams
(74) *Attorney, Agent, or Firm* — Osha Bergman Watanabe & Burton LLP

(57) ABSTRACT

A user equipment (UE) is disclosed including a receiver that receives Sounding Reference Symbol (SRS) configuration information that indicates a first resource used for transmission of a predetermined reference signal from a base station (BS). The UE includes a transmitter that transmits an SRS using a second resource that is the first resource. The UE further includes a processor that determines a precoder applied to the SRS based on the predetermined reference signal. The transmitter transmits the SRS precoded using the determined precoder. The predetermined reference signal is a Channel State Information Reference Signal (CSI-RS), an SRS, or a Synchronization Signal Block (SSB)/Physical Broadcast Channel (PBCH).

8 Claims, 7 Drawing Sheets

(56) References Cited

PUBLICATIONS

3GPP TS 36.211 V14.1.0; "3rd Generation Partnership Project; Technical Specification Group Radio Access Network; Evolved Universal Terrestrial Radio Access (E-UTRA); Physical channels and modulation (Release 14)" Dec. 2016 (175 pages).

3GPP TS 36.213 V14.1.0; "3rd Generation Partnership Project; Technical Specification Group Radio Access Network; Evolved Universal Terrestrial Radio Access (E-UTRA); Physical layer procedures (Release 14)" Dec. 2016 (414 pages).

International Search Report for corresponding International Application No. PCT/US2018/016703, dated May 14, 2018 (4 pages).

Written Opinion for corresponding International Application No. PCT/US2018/016703, dated May 14, 2018 (8 pages).

Huawei et al.; "UL SRS design for CSI acquisition and beam management", 3GPP Draft; R1-1700074; 3GPP RAN WG1 NR Ad Hoc Meeting; Spokane, USA; Jan. 16-20, 2017 (8 pages).

Huawei et al.; "QCL indication of downlink control channel and beam managment reference signals", 3GPP Draft; R1-1700405; 3GPP RAN WG1 NR Ad Hoc Meeting; Spokane, USA; Jan. 16-20, 2017 (4 pages).

Samsung; "SRS design for NR", 3GPP Draft; R1-1700933; 3GPP RAN WG1 NR Ad Hoc Meeting; Spokane, USA; Jan. 16-20, 2017 (5 pages).

LG Electronics; "Discussion on UL-MIMO schemes for NR". 3GPP Draft; R1-1611802; 3GPP TSG RAN WG1 Meeting #87; Reno, USA; Nov. 14-18, 2016 (5 pages).

Office Action issued in the counterpart Chinese Patent Application No. 201880010211.X, dated May 6, 2021 (10 pages).

\* cited by examiner

USER EQUIPMENT AND METHOD OF SRS TRANSMISSION

TECHNICAL FIELD

The present invention generally relates to a user equipment (UE) and a method of Sounding Reference Signal (SRS) transmission.

BACKGROUND ART

In a wireless communication system, a Sounding Reference Signal (SRS) is used for estimation of an uplink channel state at a base station (BS). Legacy Long Term Evolution (LTE) standards (e.g., release 13 (Rel. 13) LTE) does not explicitly support a beamformed SRS scheme to apply beamforming to the SRS used for uplink channel state.

On the other hand, a New Radio (NR) (Fifth Generation (5G)) access technology may apply beamforming to the SRS to ensure coverage of SRS transmission, reduce the number of antenna ports (APs) for the SRS transmission and reference signals (RSs), and determine an uplink beam (e.g., beam sweeping using the SRS). To apply the beamforming to the SRS, a proper physical signal is required to be designated. For example, SRS beam selection may be depended on the RS state.

CITATION LIST

Non-Patent Reference

[Non-Patent Reference 1] 3GPP, TS 36.211 V 14.1.0
[Non-Patent Reference 2] 3GPP, TS 36.213 V14.1.0

SUMMARY OF THE INVENTION

One or more embodiments of the present invention relate to a user equipment (UE) including a receiver that receives Sounding Reference Symbol (SRS) configuration information that indicates a first resource used for transmission of a predetermined reference signal from a base station (BS). The UE includes a transmitter that transmits an SRS using a second resource that is the first resource.

One or more embodiments of the present invention relate to a method of Sounding Reference Symbol (SRS) transmission in a wireless communication system including receiving, with a user equipment (UE), SRS configuration information that indicates a first resource used for transmission of a predetermined reference signal from a base station (BS), and transmitting, from the UE to the BS, an SRS using a second resource that is the first resource.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one or more embodiments of the present invention, a beam may be referred to as a resource or a radio resource.

Figure 1:
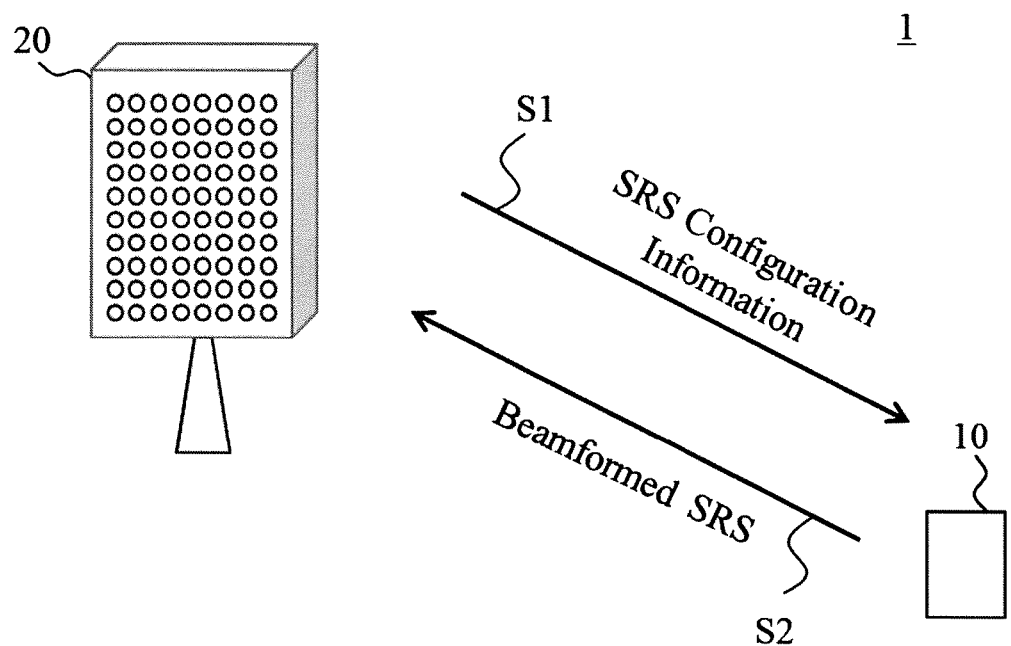
FIG. 1 is a diagram showing a configuration of a wireless communication system according to one or more embodiments of the present invention.

FIG. 1 is a wireless communications system 1 according to one or more embodiments of the present invention. The wireless communication system 1 includes a user equipment (UE) 10 and a base station (BS) 20. The wireless communication system 1 may be a New Radio (NR) system. The wireless communication system 1 is not limited to the specific configurations described herein and may be any type of wireless communication system such as an LTE/LTE-Advanced (LTE-A) system.

The BS 20 may communicate uplink (UL) and downlink (DL) signals with the UE 10 in a cell of the BS 20. The DL and UL signals may include control information and user data. The BS 20 may be new Generation NodeB (gNB).

The BS 20 includes antennas, a communication interface to communicate with an adjacent BS 20 (for example, X2 interface), a communication interface to communicate with a core network (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 may communicate DL and UL signals that include control information and user data with the BS 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

FIRST EXAMPLE

Embodiments of a first example of the present invention will be described in detail below.

In one or more embodiments of the present invention, as shown in FIG. 1, at a step S1, the BS 20 may transmit SRS configuration information.

The SRS configuration information indicates a configuration of relation between a reference signal (RS) (predetermined RS) and an SRS to be transmitted. The RS may be a Chanel State Information-Reference Signal (CSI-RS), a Synchronization Signal Block (SSB)/Physical Broadcast Channel (PBCH), a downlink Demodulation Reference Signal (DM-RS), an uplink DM-RS, or a RS in the same link such as SRS. For example, the SRS configuration information indicates a beam for transmission of the RS that is selected as a beam used for the SRS transmission. For example, the SRS configuration information indicates an RS that is used for determining beamforming vector of the SRS. For example, the beam can be determined based on reciprocity of the wireless channel.

When the UE 10 receives the SRS configuration information, the UE 10 may select a beam used for the Sounding Reference Signal (SRS) transmission based on the SRS configuration information. At a step S2, the UE 10 may transmit the SRS using the selected beam to the BS 20.

According to one or more embodiments of the first example of the present invention, the RS used for beam selection for the SRS transmission may be designated by utilizing a SRS transmission framework.

Figure 2:
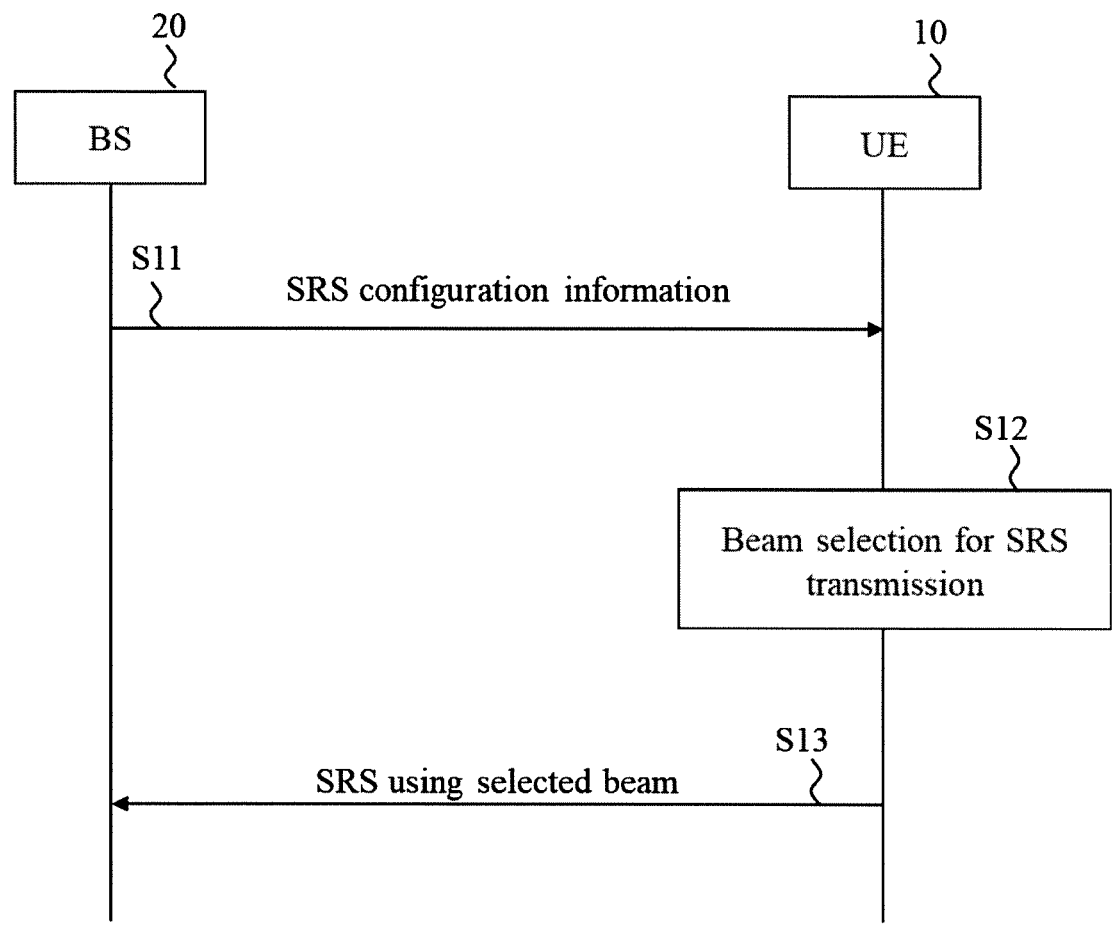
FIG. 2 is a sequence diagram showing an operation example of a beam selection scheme for SRS transmission according to one or more embodiments of a first example of the present invention.

FIG. 2 is a sequence diagram showing an example operation of a beam selection scheme according to one or more embodiments of the first example of the present invention.

As shown in FIG. 2, at step S11, the BS 20 may transmit SRS configuration information, and then, the UE 10 may receive the SRS configuration information. The SRS configuration information may be transmitted, from the BS 20 to the UE 10, via higher layer signaling such as Radio Resource Control signaling. The SRS configuration information is newly designed information used to designate the RS used for the beam selection for the SRS transmission. The SRS configuration information may indicate a beam for transmission of the RS.

At step S12, the UE 10 may select a beam for transmission of the SRS based on the SRS configuration information. For example, the UE 10 may select the beam for the transmission of the RS as the beam for the SRS transmission. For example, in the SRS configuration information, the CSI-RS, the SSB/PBCH, the SRS, or the uplink/downlink DM-RS may be designated.

At step S13, the UE 10 may transmit the SRS using the selected beam.

For example, the UE 10 may determine a precoder applied to the SRS to be transmitted based on the RS. At the step S13, the UE 10 may transmit the SRS precoded using the determined precoder.

Figure 3:
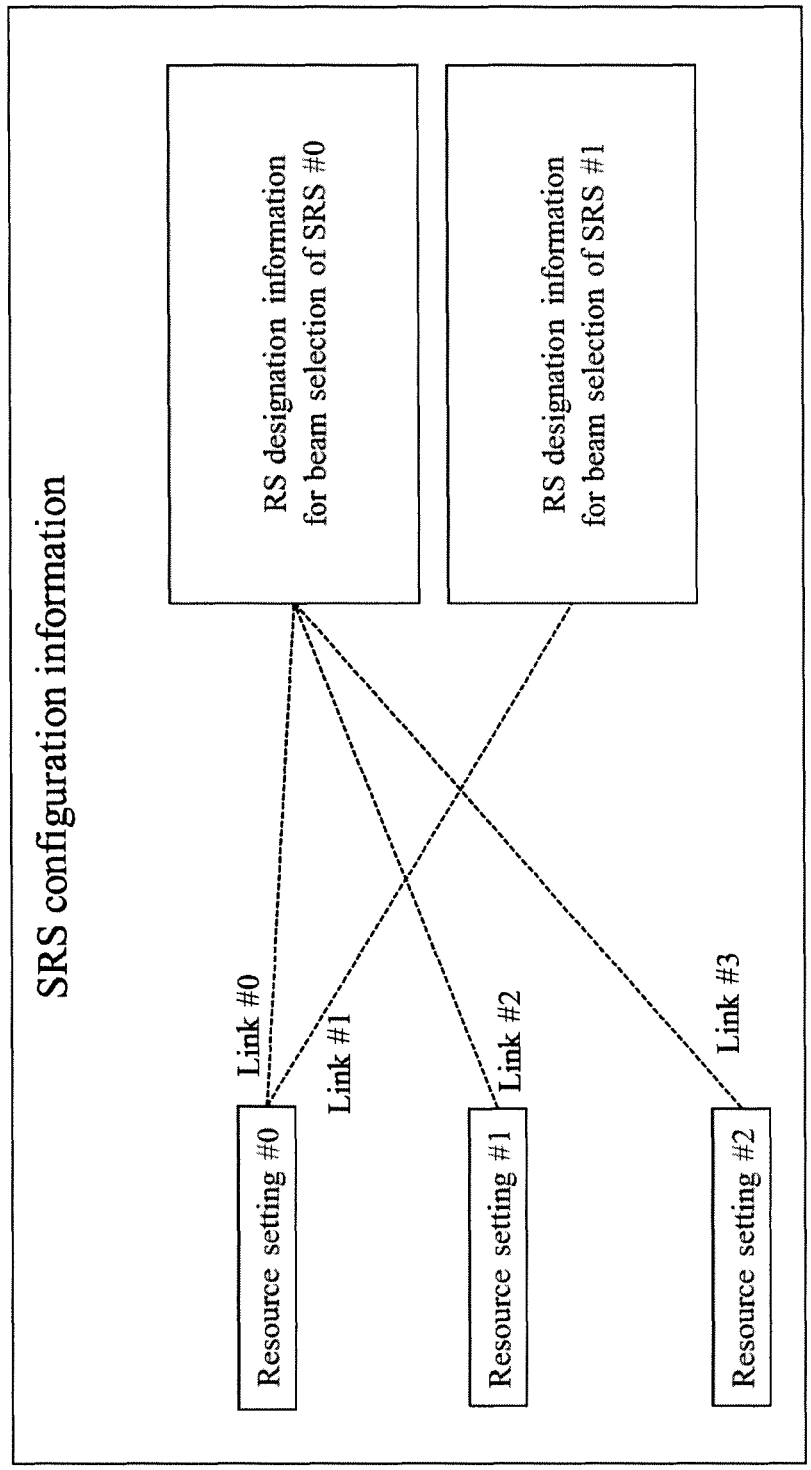
FIG. 3 is a diagram showing a configuration of SRS configuration information according to one or more embodiments of the first example of the present invention.

As shown in FIG. 3, the SRS configuration information may include "resource setting", "RS designation information for beam selection of the SRS", and "link" information. The resource setting (M>=1) includes the RS information used for measurement of signal quality and the IMR information used for interference measurement. For example, in the RS information, the RS type, the number of APs used for the RS transmission, and the time/frequency multiplexing location may be designated.

Thus, according to one or more embodiments of the first example of the present invention, the RS used for the beam selection for the SRS transmission and the beam for the transmission of the RS can be designated by utilizing the SRS transmission framework. As a result, the beam used for the SRS transmission can be determined based on the SRS transmission.

First Modified Example

Figure 4:
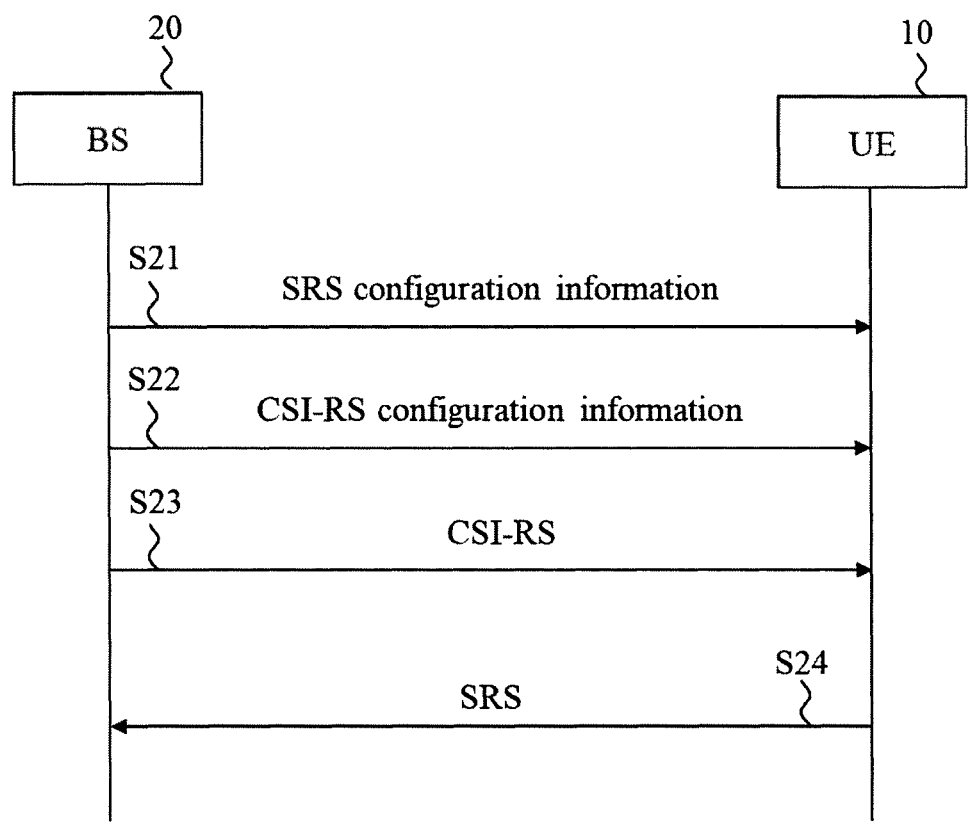
FIG. 4 is a sequence diagram showing an operation example of SRS transmission according to one or more embodiments of a first modified example of the present invention.

In one or more embodiments of a first modified example of the present invention, a beam used for the SRS transmission may be determined based on the channel information derived based on the CSI-RS (with channel reciprocity). FIG. 4 is a sequence diagram showing an example operation of SRS transmission according to one or more embodiments of a first modified example of the present invention.

As shown in FIG. 4, at step S21, the BS 20 may transmit SRS configuration information to the UE 10.

At step S22, the BS 20 may transmit CSI-RS configuration information to the UE 10. A configuration of the CSI-RS configuration information will be described with reference to FIG. 5. Then, at step S23, the BS 20 may transmit a CSI-RS, in which CSI-RS may be transmitted using a beam to the UE 10.

At step S24, the UE 10 may transmit an SRS based on reception of CSI-RS. The SRS may be precoded using a beam that is used for the CSI-RS reception. The same beamforming may be applied to all of the SRS APs. As another example, different beamforming may be applied to the SRS APs, e.g., based on multiple RSs, which are used as a reference of SRS beamforming.

Figure 5:
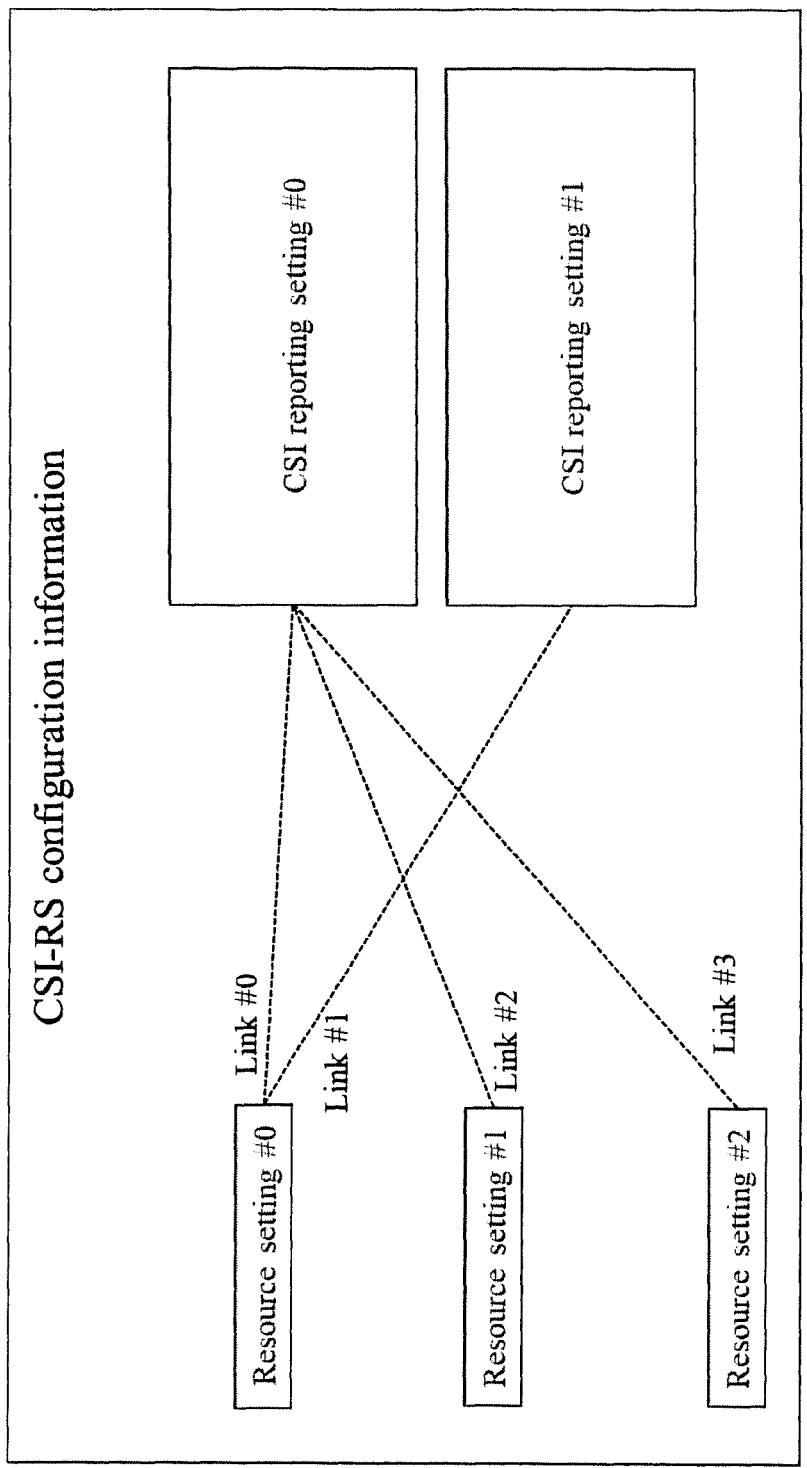
FIG. 5 is a diagram showing a configuration of CSI configuration information according to one or more embodiments of the first example of the present invention.

As shown in FIG. 5, the CSI configuration information includes "resource setting", "CSI reporting setting", and "link" information.

The resource setting (M>=1) includes RS information used for measurement of signal quality and Interference Measurement Resource (IMR) information used for interference measurement. For example, in the RS information, a RS type, the number of APs used for the RS transmission, and a time/frequency multiplexing location may be designated. In the IMR information, a time/frequency multiplexing location of the IMR.

The CSI reporting setting (N>=1) includes CSI reporting timing information, a CSI calculation method and on/off information of feedback of a Rank Indicator (RI), a Precoding Matrix Indicator (PMI), a CSI-RS Resource Indicator (CRI), and a Channel Quality Indicator (CQI). For example, in the CSI reporting timing information, "periodic", "aperiodic", or "semi-persistent" may be designated. For example, the CSI calculation method may be measurement restriction.

The link (L>=1) indicates a combination of the resource setting and the CSI report setting. In an example of FIG. 5, the four RSs corresponding to Links #0, #1, #2, and #3 are used for the CSI estimation.

According to one or more embodiments of the first modified example of the present invention, as shown in FIG. 5, the CSI reporting setting includes information for SRS transmission. For example, SRS is transmitted instead of CSI reporting. The UE 10 may determine a beam used for the SRS based on reception quality of the RSs indicated in the resource settings associated with the CSI-reporting settings.

Furthermore, according to one or more embodiments of the first modified example of the present invention, the CSI configuration information may include SRS transmission information. The SRS transmission information is information used for transmitting the SRS normally. For example, the SRS transmission information may include at least one of the number of the APs for the SRS transmission, transmission timing, frequency information and comb information. The SRS transmission information may be associated with a configuration of the SRS transmission and may be designated as SRS resource index.

Thus, according to one or more embodiments of the first modified example of the present invention, the RS used for the beam selection for the SRS transmission and the beam for the transmission of the RS can be designated by utilizing a CSI acquisition framework. As a result, the beam used for the SRS transmission can be determined based on the CSI configuration information.

Another Example of the First Example

As another example of the first example, for example, when the RSs are configured with multiple APs, the beam for the SRS transmission may be determined using a part of the multiple APs. For example, the beam for the SRS may be a beam associated with the AP of which the AP number is the smallest. Furthermore, for example, the beam for the SRS transmission may be a beam associated with the AP of which the AP number is designated by the base station 20 (gNB).

SECOND EXAMPLE

Embodiments of a second example of the present invention will be described in detail below. According to one or more embodiments of the second example of the present invention, the SRS transmission timing may be determined based on the triggered timing of the RSs.

Furthermore, according to one or more embodiments of the second example of the present invention, the SRS transmission timing may be determined based on the reception timing of the RS.

For example, according to one or more embodiments of the second example of the present invention, the SRS may be multiplexed within a subframe of the RS (self-contained frame configuration).

For example, the SRS may be transmitted at predetermined subframe from when the UE 10 receives the CSI-RS. The predetermined interval may be a constant value defined by the specification or configurable.

THIRD EXAMPLE

When a precoding matrix of the SRS has flexibility, beam management at the BS 20 may be complicated. For example, when an uplink beam has a lot of flexibility, it may be quite difficult to control uplink Quasi Co-Location (QCL) information at the BS 20.

According to one or more embodiments of the third example of the present invention, a precoding vector that is able to be applied to the SRS may be restricted. For example, the precoding vector may be selected from a predetermined codebook (e.g., Rank 1 codebook). Furthermore, the BS 20 may notify the UE 10 of the applied codebook. The restriction may be applied for limited frequency band, e.g., subband and/or limited duration of time, e.g., subframes. For example, the UE 10 may be allowed to change a beam for limited timing. For example, the UE 10 may be allowed to change a beam per 10 ms.

According to one or more embodiments of the third example of the present invention, precoding information applied to the SRS may be notified to the BS 20. For example, how the UE 10 uses the beam may be notified as the PMI or the QCL information.

According to one or more embodiments of the third example of the present invention, precoding information applied to a Physical Uplink Shared Channel (PUSCH) is transmitted with notification of the QCL information to the SRS.

According to one or more embodiments of the third example of the present invention, antenna panel(s) (or antennas) used for SRS transmission can be restricted. The restriction may be applied for limited frequency band, e.g., subband and/or limited duration of time, e.g., subframes. For example, UE may be allowed to change antenna panel(s) for limited timing. For example, UE may be allowed to change antenna panel(s) per 10 ms.

Furthermore, technologies according to one or more embodiments of the third example of the present invention may be applied to uplink RSs and uplink physical cannels.

Configuration of Base Station

Figure 6:
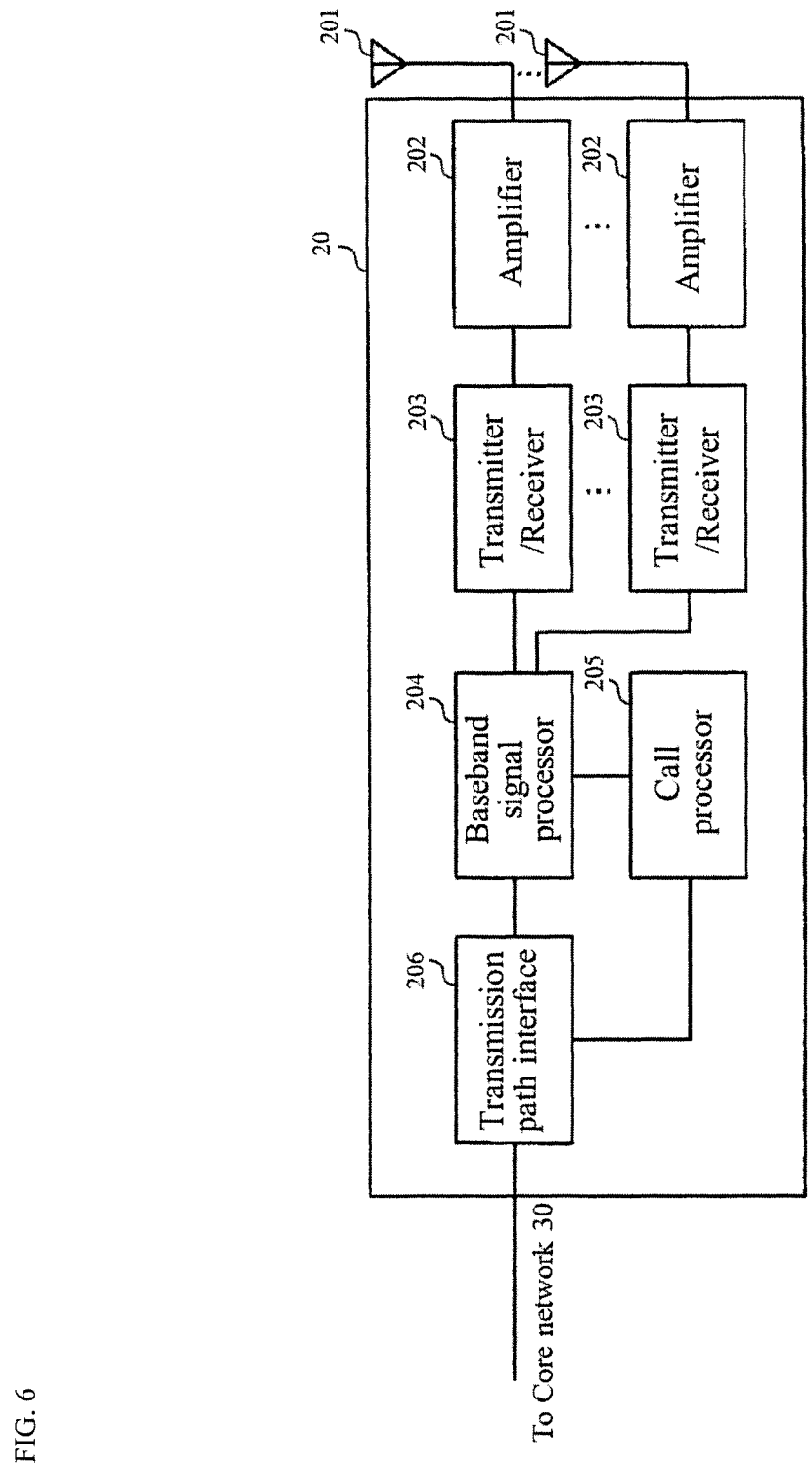
FIG. 6 is a diagram showing a schematic configuration of the BS according to one or more embodiments of the present invention.

The BS 20 according to one or more embodiments of the present invention will be described below with reference to FIG. 6. FIG. 6 is a diagram illustrating a schematic configuration of the BS 20 according to one or more embodiments of the present invention. The BS 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the BS 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the BS 20, and manages the radio resources.

Configuration of User Equipment

Figure 7:
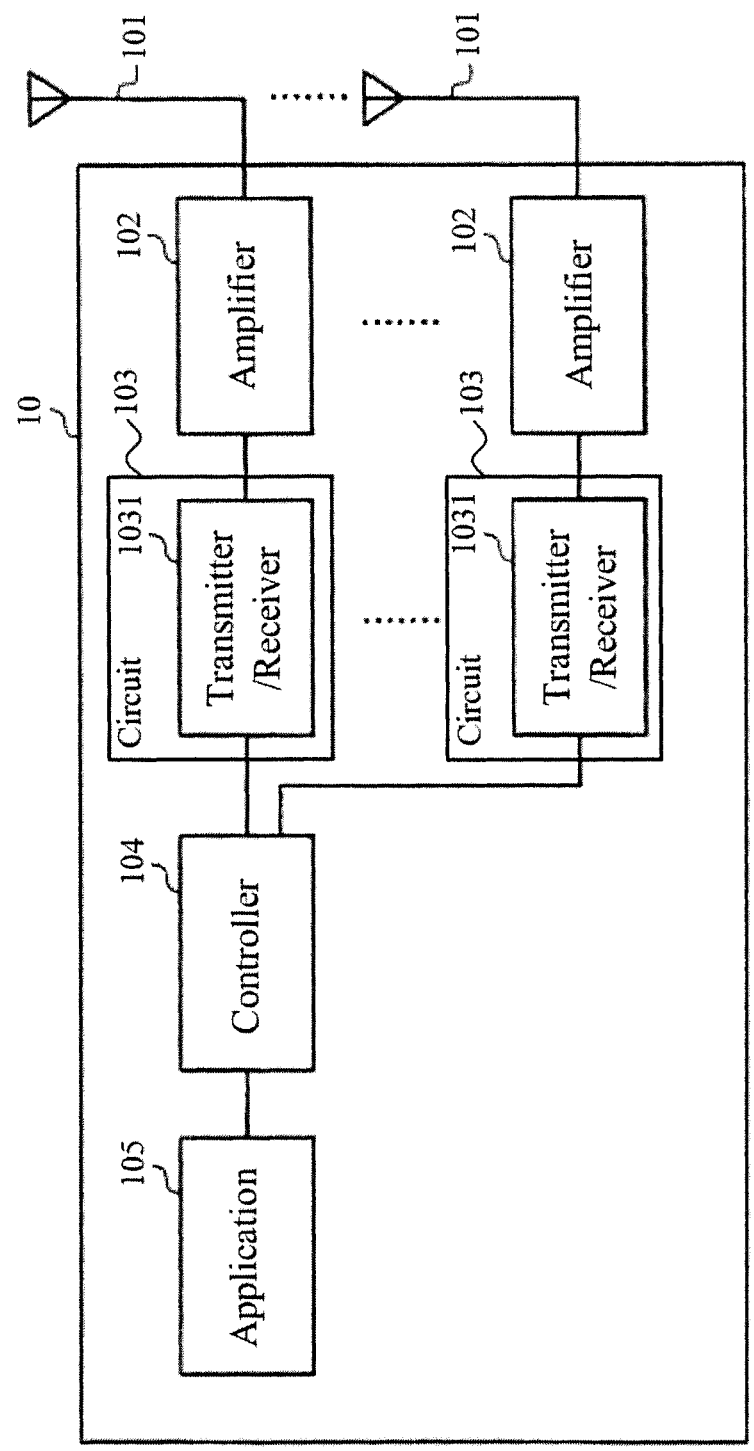
FIG. 7 is a diagram showing a schematic configuration of the UE according to one or more embodiments of the present invention.

The UE 10 according to one or more embodiments of the present invention will be described below with reference to FIG. 7. FIG. 7 is a schematic configuration of the UE 10 according to one or more embodiments of the present invention. The UE 10 has a plurality of UE antennas 101, amplifiers 102, the circuit 103 comprising transceiver (transmitter/receiver) 1031, the controller 104, and an application 105.

As for DL, radio frequency signals received in the UE antennas 101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

Another Example

One or more embodiments of the present invention may be used for each of the uplink and the downlink independently. One or more embodiments of the present invention may be also used for both of the uplink and the downlink in common.

Although the present disclosure mainly described examples of a channel and signaling scheme based on NR, the present invention is not limited thereto. One or more embodiments of the present invention may apply to another channel and signaling scheme having the same functions as LTE/LTE-A and a newly defined channel and signaling scheme.

Although the present disclosure mainly described examples of channel estimation and CSI feedback scheme based on the CSI-RS and the SRS, the present invention is not limited thereto. One or more embodiments of the present invention may apply to another synchronization signal, reference signal, and physical channel such as CSI-RS, synchronization signal (SS), measurement RS (MRS), mobility RS (MRS), and beam RS (BRS). For example, beamforming of PUSCH and/or uplink DM-RS can be determined with associated RS, e.g., CSI-RS. For example, beamforming of PDSCH and/or downlink DM-RS can be determined with associated RS, e.g., SRS. For example beamforming of CSI-RS can be determined with associated RS, e.g., SRS.

Although the present disclosure mainly described examples of various signaling methods, the signaling according to one or more embodiments of the present invention may be explicitly or implicitly performed.

Although the present disclosure mainly described examples of various signaling methods, the signaling according to one or more embodiments of the present invention may be the higher layer signaling such as the RRC signaling and/or the lower layer signaling such as Downlink Control Information (DCI) and MAC Control Element (CE). Furthermore, the signaling according to one or more embodiments of the present invention may use a Master Information Block (MIB) and/or a System Information Block (SIB). For example, at least two of the RRC, the DCI, and the MAC CE may be used in combination as the signaling according to one or more embodiments of the present invention.

Although the present disclosure described examples of the beamformed RS (RS transmission using the beam), whether the physical signal/channel is beamformed may be transparent for the UE. The beamformed RS and the beamformed signal may be called the RS and the signal, respectively. Furthermore, the beamformed RS may be referred to as a RS resource. Furthermore, the beam selection may be referred to as resource selection. Furthermore, the Beam Index may be referred to as a resource index (indicator) or an antenna port index.

The UE antennas according to one or more embodiments of the present invention may apply to the UE including one dimensional antennas, planer antennas, and predetermined three dimensional antennas.

In one or more embodiments of the present invention, the Resource Block (RB) and a subcarrier in the present disclosure may be replaced with each other. A subframe, a symbol, and a slot may be replaced with each other.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES

1 Wireless communication system
10 User equipment (UE)
101 Antenna
102 Amplifier
103 Circuit
1031 Transceiver (transmitter/receiver)

104 Controller
105 Application
106 Switch
20 Base station (BS)
2001 Baseband precoder
2002 Digital-to-Analogue Converter (DAC)
2003 Analog precoder (phase and amplitude controller)
201 Antenna element group (Antenna)
2011 Antenna element
202 Amplifier
203 Transceiver (transmitter/receiver)
204 Baseband signal processor
205 Call processor
206 Transmission path interface

What is claimed is:

1. A terminal comprising:
a receiver that receives information indicating a relationship between a Sounding Reference Symbol (SRS) and a Synchronization Signal Block (SSB)/Physical Broadcast Channel (PBCH); and
a processor that selects, based on the information, a beam that is used in the receiving of the SSB/PBCH as a beam for use in transmission of the SRS.

2. The terminal according to claim 1,
wherein the processor determines a precoder applied to the SRS based on the SSB/PBCH, and
wherein the terminal further comprises a transmitter that transmits the SRS precoded using the precoder determined by the processor.

3. The terminal according to claim 1, wherein the receiver receives the information using higher layer signaling.

4. A radio communication method for a terminal comprising:
receiving information indicating a relationship between a Sounding Reference Symbol (SRS) and a Synchronization Signal Block (SSB)/Physical Broadcast Channel (PBCH); and
selecting, based on the information, a beam that is used in the receiving of the SSB/PBCH as a beam for use in transmission of the SRS.

5. The radio communication method according to claim 4, further comprising:
determining a precoder applied to the SRS based on the SSB/PBCH, and
transmitting the SRS precoded using the determined precoder.

6. The radio communication method according to claim 4, wherein the information is received using higher layer signaling.

7. A base station comprising:
a transmitter that transmits information indicating a relationship between a Sounding Reference Symbol (SRS) and a Synchronization Signal Block (SSB)/Physical Broadcast Channel (PBCH); and
a receiver that receives the SRS transmitted from a terminal,
wherein a beam, used in the receiving of the SSB/PBCH, is selected in the terminal, based on the information, as a beam for use in transmission of the SRS.

8. A system comprising a base station and a terminal, wherein
the base station comprises:
a transmitter that transmits information indicating a relationship between a Sounding Reference Symbol (SRS) and a Synchronization Signal Block (SSB)/Physical Broadcast Channel (PBCH), and
the terminal comprises:
a receiver that receives the information; and
a processor that selects, based on the information, a beam that is used in the receiving of the SSB/PBCH as a beam for use in transmission of the SRS.

* * * * *